United States Patent
Murschall et al.

(10) Patent No.: US 6,875,803 B2
(45) Date of Patent: Apr. 5, 2005

(54) TRANSPARENT, FLAME-RETARDANT, THERMOFORMABLE, UV-RESISTANT FILM MADE FROM CRYSTALLIZABLE THERMOPLASTIC, ITS USE, AND PROCESS FOR ITS PRODUCTION

(75) Inventors: Ursula Murschall, Nierstein (DE); Ulrich Kern, Ingelheim (DE); Andreas Stopp, Ingelheim (DE); Guenther Crass, Taunusstein (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 177 days.

(21) Appl. No.: 10/181,529

(22) PCT Filed: Jan. 10, 2001

(86) PCT No.: PCT/EP01/00202

§ 371 (c)(1),
(2), (4) Date: Jul. 18, 2002

(87) PCT Pub. No.: WO01/53394

PCT Pub. Date: Jul. 26, 2001

(65) Prior Publication Data

US 2003/0004237 A1 Jan. 2, 2003

(30) Foreign Application Priority Data

Jan. 20, 2000 (DE) .......................................... 100 02 173

(51) Int. Cl.$^7$ ............................. C08K 5/34; C08K 5/09; C08K 5/53

(52) U.S. Cl. ......................... 524/91; 524/130; 524/291; 524/560

(58) Field of Search .......................... 524/91, 130, 291, 524/560

(56) References Cited

U.S. PATENT DOCUMENTS 6,689,454 B2 * 2/2004 Murschall et al. .......... 428/328

FOREIGN PATENT DOCUMENTS

| DE | 23 46787 A1 | 3/1975 |
|---|---|---|
| EP | 0 620 245 A1 | 10/1994 |
| EP | 0 785 067 A1 | 7/1997 |
| GB | 2 344 596 A | 6/2000 |
| JP | 58067411 | 4/1983 |
| JP | 04 325551 | 11/1992 |

* cited by examiner

Primary Examiner—Kriellion A. Sanders
(74) Attorney, Agent, or Firm—ProPat, L.L.C.

(57) ABSTRACT

The invention concerns transparent, flame retardant, thermoformable, UV-stabilized, single layered or multilayered films, containing a cristallizable thermoplastic material, preferably polyethyleneterephthalate, at least one flame retarding agent and a UV stabilizer as main components. Said films are characterized by good stretchability, thermoformability and good optical and mechanical properties, which makes them and the shaped bodies made from said films suitable for both inner and outer applications.

25 Claims, No Drawings

TRANSPARENT, FLAME-RETARDANT, THERMOFORMABLE, UV-RESISTANT FILM MADE FROM CRYSTALLIZABLE THERMOPLASTIC, ITS USE, AND PROCESS FOR ITS PRODUCTION

The invention relates to a transparent, flame-retardant, thermoformable, UV-resistant, oriented film made from crystallizable thermoplastics, the thickness of which is preferably from 10 to 350 μm. The film comprises at least one flame retardant and one UV absorber and has good orientability and thermoformability, and has very good optical and mechanical properties, and can be produced cost-effectively. The invention further relates to the use of the film and to a process for its production.

BACKGROUND OF THE INVENTION

Transparent, oriented films made from crystallizable thermoplastics with thickness from 10 to 350 μm are well known.

In these films, there is no UV absorber present as light stabilizer and there is no flame retardant, and the films have insufficient thermoformability, the result being that neither the films nor the items and, respectively, moldings produced from them are suitable for indoor and/or outdoor applications where fire protection or, respectively, flame retardancy and thermoformability is demanded. The films do not meet the requirements for the fire tests to DIN 4102 Part 2 and Part 1 or the UL-94 test. Even after a short period in outdoor applications, these films exhibit yellowing and impairment of mechanical properties due to photooxidative degradation by sunlight.

EP-A-0 620 245 describes films whose thermal stability has been improved. These films comprise antioxidants suitable for scavenging free radicals formed within the film and degrading any peroxide formed. That specification does not propose how the UV resistance of these films might be improved. Nor does that specification state whether these films are suitable for thermoforming processes.

DE-A 2346 787 describes a flame-retardant polymer which has been phospholane-modified. Besides the polymer, its use for producing films and fibers is also claimed.

The following shortcomings become apparent when this phospholane-modified polymer is used for film production:

The polymer is very susceptible to hydrolysis and has to be very effectively predried. When the polymer is dried using dryers of the prior art it cakes, and production of a film is therefore possible only under very difficult conditions.

The films thus produced under uneconomic conditions embrittle when exposed to heat, i.e. their mechanical properties are severely impaired by the embrittlement, making the film unusable. This embrittlement occurs after as little as 48 hours of exposure to heat.

It is an object of the present invention to provide a transparent, flame-retardant, UV-resistant, thermoformable, oriented film with thickness preferably from 10 to 350 μm which is not only produced cost-effectively and has good orientability and good mechanical and optical properties but also in particular is flame-retardant, does not embrittle on exposure to heat, has good thermoformability, and has high UV resistance.

Flame retardancy means that in what is known as a fire test the transparent film meets the conditions of DIN 4102 Part 2 and in particular the conditions of DIN 4102 Part 1 and can be allocated to construction materials class B2 and in particular B1 for low-flammability materials.

It is also intended that the film pass the UL-94 test (Vertical Burning Test for Flammability of Plastic Material), permitting its grading in class 94 VTM-0. This means that 10 seconds after removal of the Bunsen burner the film has ceased to burn, after 30 seconds no smouldering is observed, and also no burning drops occur.

High UV resistance means that sunlight or other UV radiation causes no, or only extremely little, damage to the films, and that the films or molding produced from them are therefore suitable for outdoor applications and/or critical indoor applications. In particular, after a number of years in outdoor applications the films are intended not to yellow nor to exhibit any embrittlement or surface cracking, nor to have any impairment of total mechanical properties. High UV resistance therefore means that the film absorbs UV light and does not transmit light until the visible region has been reached.

Thermoformability means that the film can be thermoformed to give complex and large-surface-area moldings on commercially available thermoforming machinery without uneconomic predrying.

Good optical properties include high light transmittance (>80%), high surface gloss (>100), extremely low haze (<20%), and also low yellowness index (YI <10).

Good mechanical properties include high modulus of elasticity ($E_{MD}$>3200 N/mm$^2$; $E_{TD}$>3500 N/mm$^2$), and also good values for tensile stress at break (in MD>100 N/mm$^2$; in TD>130 N/mm$^2$).

Good orientability includes the capability of the film to give excellent longitudinal and transverse orientation during its production, without break-offs.

Cost-effective production includes the capability of the raw materials or raw material components needed to produce the flame-retardant film to be dried using familiar industrial dryers of the prior art. It is important that the raw materials do not cake and do not become thermally degraded. These industrial dryers of the prior art include vacuum dryers, fluidized-bed dryers; fixed-bed dryers (tower dryers).

These dryers operate at temperatures of from 100 to 170° C., at which the flame-retardant polymers mentioned cake, making film production impossible. In the vacuum dryer which provides the mildest drying conditions, the raw material traverses a range of temperatures from about 30 to 130° C. under a vacuum of 50 mbar. After this, what is known as post-drying is required, in a hopper at temperatures of from 100 to 130° C., with a residence time of from 3 to 6 hours. Even here, the polymer mentioned cakes to an extreme degree.

No embrittlement on exposure to heat means that after 100 hours of heat-conditioning at 100° C. in a circulating-air oven, the film has not embrittled and does not have disadvantageous mechanical properties.

BRIEF DESCRIPTIONS OF THE INVENTION

The object of the invention is achieved by means of a transparent film with a preferred thickness in the range from 10 to 350 μm, which comprises a crystallizable thermoplastic as principal constituent, wherein the film comprises at least one UV absorber and at least one flame retardant. This is a mono or biaxially oriented film.

DETAILED DESCRIPTION OF THE INVENTION

The transparent film comprises a crystallizable thermoplastic as principal constituent. According to the invention, crystallizable thermoplastics are crystallizable homopolymers; crystallizable copolymers; crystallizable compounded materials; crystallizable recycled materials, and other types of crystallizable thermoplastics.

Preferred suitable crystallizable or semicrystalline thermoplastics are polyesters, e.g. polyethylene terephthalate, polybutylene terephthalate, and polyethylene naphthalate, preference being given to polyethylene terephthalate (PET).

It is important for the invention that the crystallizable thermoplastic has a diethylene glycol content (DEG content) of $\geq 1.0\%$ by weight, preferably $\geq 1.2\%$ by weight, in particular $\geq 1.3\%$ by weight, and/or a polyethylene glycol content (PEG content) of $\geq 1.0\%$ by weight, preferably $\geq 1.2\%$ by weight, in particular $\geq 1.3\%$ by weight, and/or an isophthalic acid content (IPA) of from 3 to 10% by weight.

It was more than surprising that by virtue of a higher diethylene glycol content and/or polyethylene glycol content and/or IPA content than in standard thermoplastics films can be thermoformed cost-effectively on commercially available thermoforming plants and provide excellent reproduction of detail.

It is also possible to use mixtures of crystallizable thermoplastics. The crystallinities of the crystallizable thermoplastics are preferably in the range from 5 to 65%.

The transparent film may be either single-layer or multi-layer. The film may also have a coating of various copolyesters or adhesion promoters.

According to the invention, the transparent film comprises at least one UV absorber and at least one flame retardant. The UV absorber is advantageously fed directly during film production by way of what is known as masterbatch technology, the concentration of the UV stabilizer preferably being from 0.01 to 5% by weight, in particular from 0.1 to 4% by weight, based on the weight of the layer of the crystallizable thermoplastic.

According to the invention, the flame retardant is fed directly during film production by way of what is known as masterbatch technology, the concentration being from 0.5 to 30% by weight, preferably from 1 to 20% by weight, based on the weight of the layer of the crystallizable thermoplastic.

Light, in particular the ultraviolet content of solar radiation, i.e. the wavelength region from 280 to 400 nm, induces degradation in thermoplastics, as a result of which their appearance changes due to color change or yellowing, and there is also an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts at below 360 nm, increases markedly below 320 nm and is very pronounced at below 300 nm. Maximum absorption occurs at between 280 and 300 nm.

In the presence of oxygen it is mainly chain cleavage which occurs, but there is no crosslinking. The predominant photooxidation products in quantity terms are carbon monoxide, carbon dioxide and carboxylic acids. Besides the direct photolysis of the ester groups, consideration has to be given to oxidation reactions which likewise form carbon dioxide, via peroxide radicals.

In the photooxidation of polyethylene terephthalate there can also be cleavage of hydrogen at the position $\alpha$ to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent matt films are those organic or organometallic compounds which produce no, or only extremely slight, color or color change in the thermoplastic to be stabilized, that is to say they are soluble in the thermoplastic.

For the purposes of the present invention, UV stabilizers suitable as light stabilizers are those which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., that is to say they do not decompose and do not cause release of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these preference is given to the 2-hydroxybenzotriazoles and the triazines.

The UV stabilizer(s) is (are) preferably present in the outer layer(s). The core layer may also have UV stabilizer, if required.

It was highly surprising that the use of the abovementioned UV stabilizers in films gave the desired result. The skilled worker would probably first have attempted to achieve a certain degree of UV resistance by way of an antioxidant, but would have found that the film rapidly yellows on weathering.

In the knowledge that UV stabilizers absorb UV light and therefore provide protection, the skilled worker would be likely to have used commercially available stabilizers. He would then have observed that the UV stabilizer has unsatisfactory thermal stability and at temperatures of from 200 to 240° C. decomposes and releases gases, and large amounts (from about 10 to 15% by weight) of the UV stabilizer have to be incorporated so that the UV light is absorbed and the film therefore not damaged.

At these high concentrations it would have been observed that the film is already yellow just after it has been produced, with Yellowness Index deviations (YI) around 25. It would also have been observed that its mechanical properties are adversely affected. Orientation would have produced exceptional problems, such as break-offs due to unsatisfactory strength, i.e. modulus of elasticity too low, die deposits, causing profile variations, roller deposits from the UV stabilizer, causing impairment of optical properties (defective adhesion, nonuniform surface), and deposits in stretching frames or heat-setting frames, dropping onto the film.

It was therefore more than surprising that even low concentrations of the UV stabilizer achieve excellent UV protection. It was very surprising that, together with this excellent UV protection:

within the accuracy of measurement, the Yellowness Index of the film is unchanged from that of an unstabilized film;

there are no releases of gases, no die deposits and no frame condensation, and the film therefore has excellent optical properties and excellent profile and layflat, and the UV-stabilized film has excellent stretchability, and can therefore be produced in a reliable and stable manner on high-speed film lines at speeds of up to 420 m/min.

The film of the invention comprises at least one flame retardant, which is fed by way of what is known as masterbatch technology directly during production of the film, and the amount of flame retardant here is from 0.5 to 30.0% by weight, preferably from 1.0 to 20.0% by weight, based on the weight of the layer of the crystallizable thermoplastic. The ratio of flame retardant to thermoplastic is generally kept at from 60:40 to 10.90% by weight during preparation of the masterbatch.

Typical flame retardants include bromine compounds, chloroparaffins and other chlorine compounds, antimony trioxide, and aluminum trihydrates, but the use of the halogen compounds here is disadvantageous due to the occurrence of halogen-containing byproducts. The low light resistance of films provided with these materials is moreover a great disadvantage, as is the evolution of hydrogen halides in the event of a fire.

Examples of suitable flame retardants used according to the invention are organophosphorus compounds, such as carboxyphosphinic acids, anhydrides of these and dimethyl methylphosphonate. A substantive factor according to the invention is that the organophosphorus compound is soluble in the thermoplastic, since otherwise the optical properties required are not complied with.

Since the flame retardants generally have some susceptibility to hydrolysis, the additional use of a hydrolysis stabilizer may be desirable.

The hydrolysis stabilizers used are generally amounts of from 0.01 to 1.0% by weight of phenolic stabilizers, the alkali metal/alkaline earth metal stearates and/or the alkali metal/alkaline earth metal carbonates. The amounts of phenolic stabilizers used are preferably from 0.05 to 0.6% by weight, in particular from 0.15 to 0.3% by weight, and their molar mass is preferably above 500 g/mol. Particularly advantageous compounds are pentaerythrityl tetrakis-3-(3,5-di-tert-butyl-4-hydroxyphenyl)propionate and 1,3,5-trimethyl-2,4,6-tris(3,5-di-tert-butyl-4-hydroxybenzyl)benzene.

It was more than surprising, therefore, that by using masterbatch technology a suitable predrying and/or precrystallization procedure and, if desired, using small amounts of a hydrolysis stabilizer, it is possible to produce a flame-retardant, thermoformable film with the required property profile in a cost-effective manner and without any caking in the dryer, and that on exposure to high temperature the film does not become brittle, and does not break when folded.

Within the accuracy of measurement, there is no adverse effect on the Yellowness Index of the film, compared with that of an unmodified film.

With this, the film of the invention is also cost-effective.

It was also very surprising that it is even possible to reuse the recycled material produced from the films or moldings without any adverse effect on the Yellowness Index of the film.

In its particularly preferred embodiment, the film of the invention also comprises from 0.01 to 5.0% by weight of 2-(4,6-diphenyl-1,3,5-triazin-2-yl)-5-hexyloxyphenol of the formula:

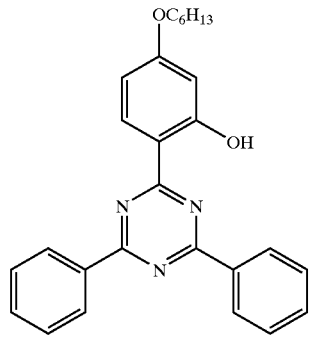

or from 0.01 to 5.0% by weight of 2,2-methylenebis(6-(2H-benzotriazol-2-yl)-4-(1,1,2,2-tetramethylpropyl)phenol of the formula:

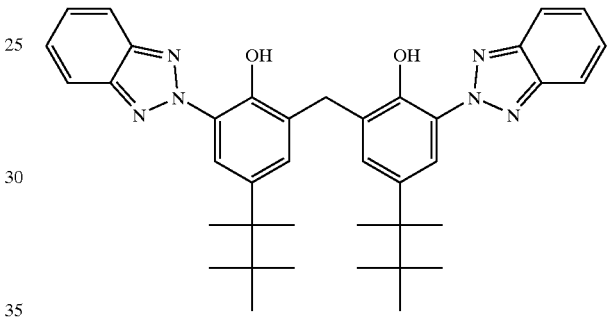

In a preferred embodiment it is also possible for mixtures of the two UV stabilizers mentioned or mixtures of at least one of the two UV stabilizers with other UV stabilizers to be used, where the total concentration of light stabilizer is preferably from 0.01 to 5.0% by weight, based on the weight of crystallizable polyethylene terephthalate.

These data for flame retardant, UV stabilizer, and hydrolysis stabilizer are also valid for other thermoplastics to be used according to the invention.

The surface gloss, measured to DIN 67530 (measurement angle: 20°), is above 100, preferably above 120, the light transmittance L, measured to ASTM D 1003, is above 80%, preferably above 84%, and the haze of the film, measured to ASTM S 1003, is below 20%, preferably below 15%. These are surprisingly good properties for the UV resistance achieved in combination with the low flammability.

The standard viscosity SV (DCA) of the polyethylene terephthalate, measured in dichloroacetic acid to DIN 53728, is from 600 to 1000, preferably from 700 to 900. The crystalline melting point measured by DSC with a heating rate of 10° C./min is preferably in the range from 220 to 280° C.

The poly ethyl ene terephthalate (PET) preferably has a diethylene glycol content (DEG content) and/or poly ethylene glycol content (PEG content) greater than 1.3% by weight, in particular greater than 1.5% by weight. In one particularly preferred embodiment, the DEG content and/or PEG content is from 1.6 to 5% by weight.

It is surprising here that oriented PET films can be thermoformed by virtue of higher diethylene glycol content and/or polyethylene glycol content than that of standard polyester.

The thermoforming process generally encompasses the steps of predrying, heating, molding, cooling, demolding, and heat-conditioning. Surprisingly, during the thermoforming process it was found that the films of the invention can be thermoformed without predrying. This advantage drastically reduces the costs of the thermoforming process when comparison is made with thermoformed polycarbonate films or thermoformed polymethacrylate films, for which predrying times of from 10 to 15 hours at temperatures of from 100 to 120° C. are required, depending on thickness.

The film of the invention, preferably a PET film, which comprises at least one UV stabilizer and one flame retardant and is thermoformable, may be either a single-layer film or else, a multilayer film.

In the multilayer embodiment, the film is composed of at least one core layer and of at least one outer layer, preference being given in particular to a three-layer A-B-A or A-B-C structure. The thicknesses of the outer layers are preferably from 0.5 to 2 µm.

For this embodiment it is important that the standard viscosity and the DEG content and/or PEG content of the crystallizable thermoplastic, e.g. the polyethylene terephthalate, of the core layer are similar to those of the polyethylene terephthalate or the thermoplastic of the outer layer(s) which is/are adjacent to the core layer.

In one particular embodiment, the outer layers, too, may be composed of a polyethylene naphthalate homopolymer or of a polyethylene terephthalate-polyethylene naphthalate copolymer, or of a compounded material.

In this embodiment, the standard viscosity of the thermoplastics of the outer layers is likewise similar to that of, for example, the polyethylene terephthalate of the core layer.

In the multilayer embodiment, the UV absorber is preferably present in the outer layers. If required, UV absorber may also be provided in the core layer.

In the multilayer embodiment, the flame retardant is preferably present in the core layer. If required, flame retardant may also be provided in the outer layers.

In another embodiment, flame retardant and UV absorber may also be present in the outer layers. If required and if fire protection requirements are stringent, the core layer may also have what is known as a base level of flame retardant.

Unlike in the single-layer embodiment, the concentration of the flame retardant and of the UV stabilizer here is based on the weight in the modified layer. The concentration ranges are identical with those in the base layer.

Very surprisingly, weathering tests to the ISO 4892 test specification using the Atlas C165 Weather-Ometer have shown that in order to improve the UV resistance of a three-layer film it is entirely sufficient for the outer layers of preferred thickness from 0.5 to 2 µm to be provided with UV stabilizers.

Again surprisingly, fire tests to DIN 4102 Part 1 and Part 2, and also the UL-94 test, have shown that the films of the invention comply with these requirements.

The flame-retardant, UV-resistant, thermoformable, multilayer films, produced by known coextrusion technology, are therefore of greater economic interest than monofilms provided with UV stabilizer and flame retardant throughout, since less additives are needed for comparable flame retardancy and UV resistance.

At least one side of the film may also have been provided with a scratch-resistant coating, with a copolyester, or with an adhesion promoter.

Weathering tests have shown that even after from 5 to 7 years (extrapolated from the weathering tests) in outdoor applications the films of the invention generally have no increased yellowing, no embrittlement, no loss of surface gloss, no surface cracking, and no impairment of mechanical properties.

During production of the film of the invention it was moreover found that the film can be oriented longitudinally and transversely without break-offs. Furthermore, no evolution of gas from the UV stabilizer or flame retardant were found during the production process, and this is very advantageous, since most UV stabilizers and flame retardants exhibit problematic evolution of gases at extrusion temperatures above 260° C., as a result of which they cannot be used.

Surprisingly, compliance of the films of the invention with construction materials class B1 to DIN 4102 Part 1 and with the UL-94 test extends as far as thicknesses in the range from 5 to 350 µm.

In the production of the film of the invention it was moreover found that the flame retardant can be incorporated by way of masterbatch technology with suitable predrying or precrystallization of the flame retardant masterbatch, without caking in the dryer, permitting cost-effective film production.

It was more than surprising that a low concentration of an added hydrolysis stabilizer in the flame retardant masterbatch further facilitates incorporation, so that throughputs and therefore production rates can be increased without difficulty. In one very specific embodiment, the film also comprises small amounts of a hydrolysis stabilizer in the layers provided with flame retardant.

Measurements have moreover shown that the film of the invention does not embrittle on exposure to heat at 100° C. over a prolonged period. This result is attributed to the synergistic action of appropriate precrystallization, predrying, masterbatch technology, and provision of UV stabilizer.

The film may moreover be thermoformed without predrying, and can therefore be used to produce complex moldings.

Examples of process parameters found for the thermoforming process were as follows:

| Step of process | Film of the invention |
| --- | --- |
| Predrying | Not required |
| Temperature of mold ° C. | 100–160 |
| Heating time | <5 sec per 10 µm of thickness |
| Film temperature during shaping ° C. | 160–200 |
| Orientation factor possible | 1.5–2.0 |
| Reproduction of detail | Good |
| Shrinkage % | <1.5 |

The film or, respectively, the molding of the invention can moreover be recycled without difficulty, without pollution of the environment, and without loss of mechanical properties, and is therefore suitable for use as short-lived advertising placards, for example, in the construction of exhibition stands, and for other promotional items, where fire protection and thermoformability is desired.

An example of a method of producing the film of the invention is the extrusion process on an extrusion line.

According to the invention, the flame retardant is added here, where appropriate with the hydrolysis stabilizer, by way of masterbatch technology. The flame retardant is dispersed in a carrier material. Carrier materials which may be used are the thermoplastic itself, e.g. the polyethylene terephthalate, or else other polymers compatible with the thermoplastic.

The light stabilizer may advantageously be fed before the material leaves the thermoplastic polymer producer, or may be metered into the extruder during film production.

It is particularly preferable to add the light stabilizer by way of masterbatch technology. The light stabilizer is dispersed in a solid carrier material. Carrier materials which may be used are certain resins, the thermoplastic itself, e.g. the polyethylene terephthalate, or else other polymers sufficiently compatible with the thermoplastic.

The DEG content and/or PEG content of the polyethylene terephthalate are advantageously set at the premises of the polymer producer during the polycondensation process.

In masterbatch technology it is important that the grain size and the bulk density of the masterbatch is similar to the grain size and the bulk density of the thermoplastic, permitting uniform distribution and therefore also uniform UV resistance.

The films of the invention may be produced by known processes, e.g. from a polyester with, where appropriate, other raw materials, e.g. the UV absorber and/or other conventional additives in conventional amounts of from 1.0 to a maximum of 30% by weight, either in the form of a monofilm or else in the form of multilayer, where appropriate coextruded films with identical or differently constructed surfaces, where one surface may, for example, have been pigmented but no pigment is present at the other surface. Known processes may also have been used to provide one or both surfaces of the film with a conventional functional coating.

A substantive factor for the invention is that the masterbatch which comprises the flame retardant and, if used, the hydrolysis stabilizer, is precrystallized or predried. This predrying includes gradual heating of the masterbatch at reduced pressure (from 20 to 80 mbar, preferably from 30 to 60 mbar, in particular from 40 to 50 mbar), with agitation, and, if desired, post-drying at a constant, elevated temperature, again at reduced pressure. It is preferable for the masterbatch to be charged at room temperature from a metering vessel in the desired blend together with the polymers of the base and/or outer layers and, if desired, with other raw material components batchwise into a vacuum dryer in which the temperature profile moves from 10 to 160° C., preferably from 20 to 150° C., in particular from 30 to 130° C., during the course of the drying time or residence time. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is post-dried in a downstream vessel, likewise evacuated, at temperatures of from 90 to 180° C., preferably from 100 to 170° C., in particular from 110 to 160° C., for from 2 to 8 hours, preferably from 3 to 7 hours, in particular from 4 to 6 hours.

In the preferred extrusion process for producing a polyester film of the invention, the molten polyester material is extruded through a slot die and quenched on a chill roll, in the form of a substantially amorphous prefilm. This amorphous prefilm is then reheated and stretched longitudinally and transversely, or transversely and longitudinally, or longitudinally, transversely and again longitudinally and/or transversely. In general, the stretching temperatures are from $T_g+10°$ C. to $T_g+60°$ C. (where $T_g$ is the glass transition temperature), the longitudinal stretching ratio is usually from 2 to 6, in particular from 3 to 4.5, and the transverse stretching ratio is from 2 to 5, in particular from 3 to 4.5, and the ratio for any second longitudinal or transverse stretching carried out is from 1.1 to 5. The first longitudinal stretching may, if desired, be carried out simultaneously with the transverse stretching (simultaneous stretching). This is followed by the heat-setting of the film at oven temperatures of from 180 to 260° C., in particular from 220 to 250° C. The film is then cooled and wound up.

The surprising combination of excellent properties makes the film of the invention and moldings produced therefrom highly suitable for a variety of different applications, such as interior decoration, for constructing exhibition stands, for exhibition requisites, for displays, for placards, for protective glazing of machines or vehicles, in the lighting sector, in fitting out shops or stores, or as a promotional requisite, laminating material, for greenhouses, roofing systems, exterior cladding, protective coverings, applications in the construction sector, illuminated advertizing profiles, blinds, or electrical applications.

The thermoformability of the film of the invention makes it suitable for thermoforming any desired moldings for indoor or outdoor applications.

The examples below illustrate the invention in more detail.

The following standards and methods are used here when testing individual properties.

Test Methods

DIN=Deutsches Institut für Normung [German Standards Institute]

ISO=International Organization for Standardization.

DEG Content, PEG Content, and IPA Content

DEG/PEG/IPA content is determined by gas chromatography after saponification in methanolic KOH and neutralization with aqueous HCl.

Surface Gloss

Surface gloss is measured with a measurement angle of 20° to DIN 67530.

Light Transmittance

Light transmittance is the ratio of total light transmitted to the amount of incident light.

Light transmittance is measured using "®HAZEGARD plus" test equipment to ASTM D 1003.

Haze

Haze is that percentage proportion of the transmitted light which deviates by more than 2.5° from the average direction of the incident light beam. Clarity is determined at an angle of less than 2.5°.

Haze is measured using "HAZEGARD plus" apparatus to ASTM D 1003.

Surface Defects

Surface defects are determined visually.

Mechanical Properties

Modulus of elasticity, tensile strength at break and elongation at break are measured longitudinally and transversely to ISO 527-1-2.

SV (DCA) and IV (DVA)

Standard viscosity SV (DCA) is measured by a method based on DIN 53726 in dichloroacetic acid.

Intrinsic viscosity (IV) is calculated as follows from standard viscosity (SV)

$$IV(DCA)=6.67 \cdot 10^{-4} \, SV(DCA)+0.118$$

Fire Performance

Fire performance is determined to DIN 4102, Part 2, construction materials class B2, and to DIN 4102, Part 1, construction materials class B1, and also by the UL-94 test.

Weathering (on Both Sides) and UV Resistance

UV resistance is tested as follows to the ISO 4892 test specification

| | |
|---|---|
| Test equipment: | Atlas Ci 65 Weather-Ometer |
| Test conditions: | ISO 4892, i.e. artificial weathering |
| Irradiation time: | 1000 hours (per side) |
| Irradiation: | 0.5 W/m$^2$, 340 nm |
| Temperature: | 63° C. |
| Relative humidity: | 50% |
| Xenon lamp: | Internal and external filter made from borosilicate |
| Irradiation cycles: | 102 minutes of UV light, then 18 minutes of UV light with water spray onto the specimens, then another 102 minutes of UV light, etc. |

Numerical values of <0.6 are negligible and indicate that there is no significant color change.

Yellowness Index

Yellowness Index (YI) is the deviation from the colorless condition in the "yellow" direction and is measured to DIN 6167. Yellowness Index values (YI)<5 are not visible.

In the examples and comparative examples below each of the films is a transparent film of different thickness, produced on the extrusion line described.

Each of the films was first weathered on both sides to the test specification of ISO 4892 for 1000 hours per side, using an Atlas Ci 65 Weather-Ometer, and then tested for mechanical properties, Yellowness Index (YI), surface defects, light transmittance and gloss.

Fire tests to DIN 4102, Part 2 and Part 1, and the UL-94 test, were carried out on each film.

EXAMPLES

Example 1

A transparent film of 50 µm thickness is produced, comprising polyethylene terephthalate as principal constituent, 0.2% by weight of ®Sylobloc (silicon dioxide) as antiblocking agent, 4% by weight of the organophosphorus compound as flame retardant and 1.0% by weight of the UV stabilizer 2-(4,6-diphenyl-1,3,5-triazin-2-yl)-5-hexyloxyphenol (®Tinuvin 1577, from Ciba-Geigy). Tinuvin 1577 has a melting point of 149° C. and is thermally stable up to about 330° C.

To obtain homogeneous distribution, 0.2% by weight of Sylobloc is incorporated directly into the polyethylene terephthalate (PET) when the polymer is prepared.

The polyethylene terephthalate from which the transparent film is produced has a standard viscosity SV (DCA) of 810, corresponding to an intrinsic viscosity IV (DCA) of 0.658 dl/g. Both DEG content and PEG content are 1.6% by weight.

Tinuvin 1577 has a melting point of 149° C. and is thermally stable up to about 330° C.

The UV stabilizer Tinuvin 1577 is fed in the form of a masterbatch. The masterbatch is composed of 5% by weight of Tinuvin 1577 as active ingredient and 95% by weight of PET having a standard viscosity SC (DCA)=810, corresponding to an intrinsic viscosity IV (DCA) of 0.658 dl/g.

The flame retardant is the organophosphorus compound dimethyl methylphosphonate, ®Amgard P 1045 from Albright & Wilson, which is soluble in PET.

The flame retardant is likewise fed in the form of a masterbatch. The masterbatch is composed of 20% by weight of flame retardant and 80% by weight of PET having a standard viscosity SV (DCA) of 810.

Both of the masterbatches have bulk density of 750 kg/m$^3$.

40% by weight of PET with 0.2% by weight of Sylobloc, 30% by weight of recycled PET material, 10% by weight of UV masterbatch and 20% by weight of flame retardant masterbatch are discharged at room temperature from separate metering vessels into a vacuum dryer which operates with a temperature profile of from 25 to 130° C. from the time of charging to the end of the residence time. During the residence time of about 4 hours, the mixture of raw materials is agitated at 61 rpm.

The precrystallized and/or predried mixture of raw materials is post-dried for 4 hours at 140° C. in a downstream hopper, again in vacuo. The 50 µm monofilm is then produced by the extrusion process described.

The transparent PET film produced has the following property profile:

| | |
|---|---|
| Thickness: | 50 µm |
| Surface gloss, Side 1: | 155 |
| (Measurement angle 20°) Side 2: | 152 |
| Light transmittance: | 91% |
| Haze: | 4.0% |
| Surface defects per m$^2$: (cracks, embrittlement) | none |
| Longitudinal modulus of elasticity: | 3550 N/mm$^2$ |
| Transverse modulus of elasticity: | 4700 N/mm$^2$ |
| Longitudinal tensile strength at break: | 110 N/mm$^2$ |
| Transverse tensile strength at break: | 190 N/mm$^2$ |
| Yellowness Index (YI): | 3.1 |

After 200 hours of heat treatment at 100° C. in a circulating-air drying cabinet there is no change in mechanical properties. The film shows no embrittlement phenomena of any kind.

The film complies with the requirements for construction material classes B2 and B1 to DIN 4102 Part 2/Part 1. The film passes the UL-94 test.

After in each case 1000 hours of weathering per side with the Atlas Ci 65 Weather-Ometer, the PET film has the following properties:

| | |
|---|---|
| Thickness: | 50 µm |
| Surface gloss, Side 1: | 148 |
| (Measurement angle 20°) Side 2: | 146 |
| Light transmittance: | 89.9% |
| Haze: | 4.2% |
| Surface defects per m$^2$: (cracks, embrittlement) | none |
| Longitudinal modulus of elasticity: | 3400 N/mm$^2$ |
| Transverse modulus of elasticity: | 4550 N/mm$^2$ |
| Longitudinal tensile strength at break: | 102 N/mm$^2$ |
| Transverse tensile strength at break: | 178 N/mm$^2$ |
| Yellowness Index (YI): | 3.2 |

Example 2

Coextrusion technology is used to produce a multilayer PET film having the layer sequence A-B-A and a thickness of 17 µm, B being the core layer and A being the outer layers. The core layer has a thickness of 15 µm, and each of the two outer layers which cover the core layer has a thickness of 1 µm.

The polyethylene terephthalate used for the core layer B is identical with the polymer of Example 1 except that it comprises no Sylobloc. The core layer comprises 0.2% by weight of hydrolysis stabilizer and 5% by weight of flame retardant. As in Example 1, the hydrolysis stabilizer and the flame retardant are fed in the form of a masterbatch. The masterbatch is composed of 25% by weight of flame retardant, 1% by weight of hydrolysis stabilizer and 74% by weight of polyethylene terephthalate. The flame retardant is identical with that used in Example 1. The hydrolysis stabilizer is pentaerythrityl tetrakis-3-(3,5-di-tert-butyl-4-hydroxyphenyl)propionate.

The polyethylene terephthalate of the outer layers A is identical with the polyethylene terephthalate of Example 1, that is to say the outer layer polymer has 0.2% by weight of Sylobloc. The outer layers comprise no hydrolysis stabilizer and no flame retardant. The outer layers additionally comprise 1.0% by weight of Tinuvin 1577, and this amount was incorporated directly at the premises of the polymer producer.

For the core layer, 50% by weight of polyethylene terephthalate, 30% by weight of recycled polyethylene terephthalate material and 20% by weight of the masterbatch described are precrystallized, predried and post-dried as in Example 1.

The outer layer polymer, which comprises Sylobloc and 1% by weight of Tinuvin 1577, is not subjected to any particular drying. Coextrusion technology is used to produce a film having the layer sequence A-B-A, thickness of 17 μm, and the following property profile:

| | |
|---|---|
| Layer structure: | A-B-A |
| Thickness: | 17 μm |
| Surface gloss Side 1: | 174 |
| (Measurement angle 20°) Side 2: | 169 |
| Light transmittance: | 94.2% |
| Haze: | 2.1% |
| Surface defects per m$^2$: (cracks, embrittlement) | none |
| Longitudinal modulus of elasticity: | 3500 N/mm$^2$ |
| Transverse modulus of elasticity: | 4150 N/mm$^2$ |
| Longitudinal tensile strength at break: | 120 N/mm$^2$ |
| Transverse tensile strength at break: | 155 N/mm$^2$ |
| Yellowness Index (YI): | 2.7 |

After 200 hours of heat treatment at 100° C. in a circulating-air drying cabinet there is no change in mechanical properties. The film shows no embrittlement phenomena of any kind.

The film complies with the requirements for construction material classes B2 and B1 to DIN 4102 Part 2 and Part 1. The film passes the UL test.

After in each case 1000 hours of weathering per side with the Atlas Ci 65 Weather-Ometer the PET film has the following properties:

| | |
|---|---|
| Thickness: | 17 μm |
| Surface gloss Side 1: | 168 |
| (Measurement angle 20°) Side 2: | 160 |
| Light transmittance: | 91.6% |
| Haze: | 2.9% |
| Surface defects per m$^2$: (cracks, embrittlement) | none |
| Longitudinal modulus of elasticity: | 3400 N/mm$^2$ |
| Transverse modulus of elasticity: | 4000 N/mm$^2$ |
| Longitudinal tensile strength at break: | 105 N/mm$^2$ |
| Transverse tensile strength at break: | 145 N/mm$^2$ |
| Yellowness Index (YI): | 3.2 |

Example 3

As in Example 2, an A-B-A film of 20 μm thickness is produced, the core layer B having a thickness of 16 μm and each outer layer A having a thickness of 2 μm.

The core layer B comprises only 5% by weight of the flame retardant masterbatch of Example 2.

The outer layers are identical with those of Example 2, except that they additionally comprise 20% by weight of the flame retardant masterbatch, used in Example 2 only for the core layer.

The polymers and the masterbatches for the core layer and the outer layers are precrystallized, predried and post-dried as in Example 1.

The multilayer 20 μm film produced using coextrusion technology has the following property profile:

| | |
|---|---|
| Layer structure: | A-B-A |
| Thickness: | 20 μm |
| Surface gloss Side 1: | 165 |
| (Measurement angle 20°) Side 2: | 169 |
| Light transmittance: | 92.0% |
| Haze: | 2.5% |
| Surface defects per m$^2$: (cracks, embrittlement) | none |
| Longitudinal modulus of elasticity: | 3450 N/mm$^2$ |
| Transverse modulus of elasticity: | 4000 N/mm$^2$ |
| Longitudinal tensile strength at break: | 125 N/mm$^2$ |
| Transverse tensile strength at break: | 160 N/mm$^2$ |
| Yellowness Index (YI): | 2.9 |

After 200 hours of heat treatment at 100° C. in a circulating-air drying cabinet there is no change in mechanical properties. The film shows no embrittlement phenomena of any kind.

The film complies with the requirements for the construction material classes 2 and B1 to DIN 4102 Part 2 and Part 1. The film passes the UL test.

After in each case 1000 hours of weathering per side with the Atlas Ci 65 Weather-Ometer the PET film has the following properties:

| | |
|---|---|
| Thickness: | 20 μm |
| Surface gloss Side 1: | 161 |
| (Measurement angle 20°) Side 2: | 155 |
| Light transmittance: | 91.2% |
| Haze: | 3.1% |
| Surface defects per m$^2$: (cracks, embrittlement) | none |
| Longitudinal modulus of elasticity: | 3400 N/mm$^2$ |
| Transverse modulus of elasticity: | 3850 N/mm$^2$ |
| Longitudinal tensile strength at break: | 115 N/mm$^2$ |
| Transverse tensile strength at break: | 145 N/mm$^2$ |
| Yellowness Index (YI): | 3.5 |

Thermoformability

The films from Examples 1 to 3 may be thermoformed to give moldings on commercially available thermoforming machinery, e.g. from the company Illig, without predrying. The reproduction of detail in the moldings is excellent and the surface is uniform.

Comparative Example 1

Example 2 is repeated, except that the film is not provided with UV stabilizers, nor with flame retardant masterbatch, that is to say the film comprises no hydrolysis stabilizer, no flame retardant and no UV stabilizer. DEG content is the commercially available 0.7% by weight, and no PEG is present.

The transparent PET film produced has the following property profile:

| | |
|---|---|
| Thickness: | 17 μm |
| Surface gloss Side 1: | 175 |
| (Measurement angle 20°) Side 2: | 165 |
| Light transmittance: | 92% |
| Haze: | 2.3% |
| Surface defects per m$^2$: | none |
| Longitudinal modulus of elasticity: | 4100 N/mm$^2$ |
| Transverse modulus of elasticity: | 4800 N/mm$^2$ |
| Longitudinal tensile strength at break: | 180 N/mm$^2$ |
| Transverse tensile strength at break: | 210 N/mm$^2$ |
| Yellowness Index (YI): | 2.8 |

The unmodified film does not meet the requirements of the tests to DIN 4102 Part 1 and Part 2, nor those of the UL-94 test.

The film has insufficient thermoformability.

After 1000 hours of weathering per side using the Atlas CI Weather-Ometer, the film exhibits surface cracks and embrittelement phenomena. It is therefore impossible to measure a precise property profile—in particular mechanical properties. The film also shows visible yellowing.

What is claimed is:

1. A transparent, thermoformable, oriented film made from a crystallizable thermoplastic polyester or from a mixture of various crystallizable thermoplastic polyester as principal constituent and from at least one flame retardant and from at least one UV stabilizer,
    wherein the polyester has at least one of either a diethylene glycol content or a polyethylene glycol content of from about 1.0 to about 5% by weight, said film exhibiting a modulus of elasticity in the machine direction of greater than 3200 N/mm$^2$ and a modulus of elasticity in the transverse direction of greater than 3500 N/mm$^2$.

2. The film as claimed in claim 1, wherein the thermoplastic has a crystallinity of from about 5 to about 65%.

3. The film as claimed in claim 1, wherein the thermoplastic comprises a polyester.

4. The film as claimed in claim 1, wherein the thermoplastic comprises polyethylene terephthalate, polybutylene terephthalate or polyethylene naphthalate.

5. The film as claimed in claim 4, wherein the thermoplastic comprises polyethylene terephthalate.

6. The film as claimed in claim 5, wherein the polyethylene terephthalate has a diethylene glycol content or a polyethylene glycol content or a diethylene glycol content and a polyethylene glycol content of more than about 1.3% by weight.

7. The film as claimed in claim 5, wherein the polyethylene terephthalate has a diethylene glycol content or a polyethylene glycol content or a diethylene glycol content and a polyethylene glycol content of from about 1.6 to about 5% by weight.

8. The film as claimed in claim 5, wherein the polyethylene terephthalate has a standard viscosity SV (DCA) of from about 600 to about 1000.

9. The film as claimed in claim 1, wherein the flame retardant comprises organophosphorus compounds or mixtures of organophosphorus compounds and the UV stabilizer comprises 2-hydroxybenzotriazoles or triazines or mixtures of these UV stabilizers.

10. The film as claimed in claim 1, wherein the UV stabilizer comprises 2-(4,6-diphenyl-1,3,5-triazin-2-yl)-5-hexyloxyphenol or 2,2'-methylenebis-6-(2H-benzotriazol-2-yl)-4-(1,1,2,2-tetramethylpropyl)phenol or mixtures of these UV stabilizers or mixtures of these UV stabilizers with others.

11. The film as claimed in claim 1, wherein the concentration of the UV stabilizer or UV stabilizes is from about 0.01 to about 5% by weight, based on the weight of the crystallizable thermoplastic.

12. The film as claimed in claim 9, wherein the organophosphorus compound or the organophosphorus compounds is or are soluble in the thermoplastic.

13. The film as claimed in claim 1, wherein the flame retardant used is dimethyl methylphosphonate.

14. The film as claimed in claim 1, wherein the concentration of the flame retardant or flame retardants is from about 0.5 to about 30% by weight, based on the weight of the crystallizable thermoplastic.

15. The film as claimed in claim 1, wherein the film comprises from about 0.1 to about 1% by weight of a hydrolysis stabilizer, based on the weight of the crystallizable thermoplastic.

16. The film as claimed in claim 1, wherein the hydrolysis stabilizer is pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene.

17. The film as claimed in claim 1, wherein the film has two or more layers.

18. The film as claimed in claim 17, wherein the flame retardant or the UV stabilizer or the flame retardant and the UV stabilizer is or are in present in the outer layer or layers only.

19. The film as claimed in claim 1, wherein the film has a thickness of from about 1 to bout 350 μm.

20. A process for producing a film as claimed in claim 1, which comprises the steps of melting extruding, biaxially orienting and setting a crystallizable thermoplastic or a mixture made from crystallizable thermoplastics in an extruder, together with at least one flame retardant and at least one UV stabilizer.

21. The process as claimed in claim 20, wherein flame retardant and UV stabilizer are added by way of masterbatch technology.

22. A method of making a molding which method comprises transforming a film as claimed in claim 1 into a molding.

23. A molding comprising a film as claimed in claim 1.

24. A film according to claim 1, wherein said polyester comprises a mixture of both diethylene glycol and polyethylene glycol, said mixture present in an amount ranging from about 1.3 to about 5% by weight.

25. A film according to claim 1, wherein said at least one flame retardant is incorporated into said polyester as a precrystallized or predried masterbatch, said polyester thus further comprising precrystallized or predried carrier material.

* * * * *